US012768563B2

(12) United States Patent
Combs

(10) Patent No.: US 12,768,563 B2
(45) Date of Patent: Oct. 20, 2026

(54) METHOD FOR RETROFITTING A REGISTER BOX WITH AN EXPANDABLE POLYMERIC FOAM MATERIAL

(71) Applicant: STERLING CUSTOM SHEET METAL, INC., Magnolia, TX (US)

(72) Inventor: Sterling Kidd Combs, Magnolia, TX (US)

( * ) Notice: Subject to any disclaimer, the term of this patent is extended or adjusted under 35 U.S.C. 154(b) by 746 days.

(21) Appl. No.: 18/351,695

(22) Filed: Jul. 13, 2023

(65) Prior Publication Data

US 2023/0392819 A1 Dec. 7, 2023

Related U.S. Application Data

(60) Continuation-in-part of application No. 18/159,389, filed on Jan. 25, 2023, which is a continuation-in-part of application No. 18/055,557, filed on Nov. 15, 2022, which is a continuation-in-part of application No. 17/196,678, filed on Mar. 9, 2021, now Pat. No. 12,276,434, which is a continuation-in-part of application No. 17/175,956, filed on Feb. 15, 2021, now Pat. No. 12,104,820, which is a continuation-in-part of application No. 17/175,922, filed on Feb. 15, 2021, now Pat. No. 12,000,613, (Continued)

(51) Int. Cl.

| | |
|---|---|
| ***F24F 13/08*** | (2006.01) |
| ***B29C 41/20*** | (2006.01) |
| ***B29C 44/18*** | (2006.01) |
| ***B29C 44/36*** | (2006.01) |
| ***B29K 75/00*** | (2006.01) |
| ***B29K 105/00*** | (2006.01) |
| ***F24F 13/06*** | (2006.01) |

(52) U.S. Cl.

CPC ............ *F24F 13/082* (2013.01); *B29C 41/20* (2013.01); *B29C 44/18* (2013.01); *F24F 13/06* (2013.01); *B29C 44/36* (2013.01); *B29K 2075/00* (2013.01); *B29K 2105/0058* (2013.01); *B29K 2995/0015* (2013.01); *Y10T 29/49158* (2015.01); *Y10T 428/233* (2015.01)

(58) Field of Classification Search

None

See application file for complete search history.

(56) References Cited

U.S. PATENT DOCUMENTS

| | | | | |
|---|---|---|---|---|
| 1,788,721 A * | 1/1931 | Klomparens | .......... | F24F 13/08 454/332 |
| 3,985,158 A | 10/1976 | Felter | | |
| 4,735,235 A | 4/1988 | Anderson | | |
| 5,095,942 A | 3/1992 | Murphy | | |
| 5,658,196 A | 8/1997 | Swaim | | |

(Continued)

*Primary Examiner* — Virak Nguon

(74) *Attorney, Agent, or Firm* — Egbert, McDaniel & Swartz, PLLC

(57) ABSTRACT

A method of insulating a register box in which the register box has a body and a duct. The method includes accessing the register box such that the interior of the register box can be reached, removing existing insulation from the interior of the body of the register box, injecting an expandable polymeric material into the interior of the body of the register box, and allowing the expandable polymeric material to cure for a period of time. The opening of the duct of the register box is blocked during the step of curing. The step of injecting includes inserting a foam gun into an interior of the body of the register box and directing the expandable polymeric material from the foam gun toward a wall of the body of the register box.

16 Claims, 3 Drawing Sheets

Related U.S. Application Data which is a continuation-in-part of application No. 17/171,638, filed on Feb. 9, 2021, now Pat. No. 12,083,716, which is a continuation-in-part of application No. 16/036,059, filed on Jul. 16, 2018, now Pat. No. 11,060,756, which is a continuation-in-part of application No. 15/864,612, filed on Jan. 8, 2018, now Pat. No. 10,995,969, which is a division of application No. 14/668,079, filed on Mar. 25, 2015, now Pat. No. 9,951,969, said application No. 16/036,059 is a continuation-in-part of application No. 16/005,235, filed on Jun. 11, 2018, now Pat. No. 11,402,121, which is a continuation-in-part of application No. 15/703,436, filed on Sep. 13, 2017, now Pat. No. 10,648,695, which is a continuation-in-part of application No. 15/439,454, filed on Feb. 22, 2017, now Pat. No. 10,309,682, which is a continuation-in-part of application No. 14/668,079, filed on Mar. 25, 2015, now Pat. No. 9,951,969.

(56) References Cited

U.S. PATENT DOCUMENTS

| | | | | |
|---|---|---|---|---|
| 5,749,190 | A | 5/1998 | Williams | |
| 5,957,506 | A | 9/1999 | Stepp | |
| 9,951,969 | B2 | 4/2018 | Combs | |
| 10,309,682 | B2 | 6/2019 | Combs | |
| 10,648,695 | B2 | 5/2020 | Combs | |
| 2004/0130154 | A1 | 7/2004 | Stepp | |
| 2008/0014860 | A1 | 1/2008 | Heitman | |
| 2008/0045137 | A1 * | 2/2008 | Rosal | F24F 13/0263 454/292 |
| 2014/0167405 | A1 * | 6/2014 | Lahey | F24F 13/06 285/64 |
| 2014/0339320 | A1 * | 11/2014 | Gantenbein | B05B 12/004 239/71 |
| 2016/0102183 | A1 * | 4/2016 | Sobotka | C08J 9/00 521/170 |
| 2018/0187919 | A1 | 7/2018 | Combs | |
| 2018/0363942 | A1 | 12/2018 | Combs | |

* cited by examiner

METHOD FOR RETROFITTING A REGISTER BOX WITH AN EXPANDABLE POLYMERIC FOAM MATERIAL

CROSS-REFERENCE TO RELATED APPLICATIONS

The present application is a continuation-in-part of U.S. patent application Ser. No. 18/159,389, filed on Jan. 25, 2023, presently pending. U.S. patent application Ser. No. 18/159,389 was a continuation-in-part of U.S. patent application Ser. No. 18/055,557, filed on Nov. 15, 2022. U.S. patent application Ser. No. 18/055,557 is a continuation-in-part of U.S. patent application Ser. No. 17/196,678, filed on Mar. 9, 2021 and is presently pending. U.S. patent application Ser. No. 17/196,678 is a continuation-in-part of U.S. patent application Ser. No. 17/175,956, filed on Feb. 15, 2021, presently pending. U.S. patent application Ser. No. 17/175,596 is a continuation-in-part of U.S. patent application Ser. No. 17/175,922, filed on Feb. 15, 2021, presently pending. U.S. patent application Ser. No. 17/175,922 is a continuation-in-part of U.S. patent application Ser. No. 17/171,638, filed on Feb. 9, 2021, presently pending. U.S. patent application Ser. No. 17/171,638 is a continuation-in-part of U.S. patent application Ser. No. 16/036,059, filed on Jul. 16, 2018 which issued as U.S. Pat. No. 11,060,756 on. Jul. 13, 2021. U.S. patent application Ser. No. 16/036,059 is a continuation-in-part of U.S. patent application Ser. No. 15/864,612, filed on Jan. 8, 2018, which issued as U.S. Pat. No. 10,995,969 on May 4, 2021. U.S. patent application Ser. No. 15/864,612 is a division of U.S. patent application Ser. No. 14/668,079, filed on Mar. 25, 2015, which issued as U.S. Pat. No. 9,951,969 on Apr. 24, 2018. U.S. patent application Ser. No. 16/036,059 is a continuation-in-part of U.S. patent application Ser. No. 16/005,235, filed on Jun. 11, 2018, which issued as U.S. Pat. No. 11,402,121 on Aug. 2, 2022. U.S. patent application Ser. No. 16/005,235 is a continuation-in-part of U.S. patent application Ser. No. 15/703,436, filed on Sep. 13, 2017, which issued as U.S. Pat. No. 10,648,695 on May 12, 2020. U.S. Patent Application No. is a continuation-in-part of U.S. patent application Ser. No. 15/439,454, filed on Feb. 22, 2017, which issued as U.S. Pat. No. 10,309,682 on Jun. 4, 2019. U.S. patent application Ser. No. 14/439,454 is a continuation-in-part of U.S. patent application Ser. No. 14/668,079, filed on Mar. 25, 2015, in which issued as U.S. Pat. No. 9,951,969 on Apr. 24, 2018.

FIELD OF THE INVENTION

The present invention relates to ductwork for heating, ventilation and air-conditioning (HVAC) systems. More particularly, the present invention relates to the processes for installing an expandable polymeric material into a register box for the purpose of replacing existing insulation with the expandable polymeric material.

BACKGROUND OF THE INVENTION

To create the desired ambient conditions within a structure, a typical HVAC system is installed for circulating and/or conditioning air drawn from the interior of the structure and returned to the interior of the structure. A central unit or several units are located in or near the structure, each unit comprising a fan for air circulation and optionally comprising a heating, humidification, or cooling system for conditioning the air passing through the central unit.

To conduct air to and from each central unit, ducting is provided in the structure. The ducting includes supply-air ducts which provide conditioned air to the interior of the structure and are connected to the outlets of each central unit and return-air ducts which return air to each central unit and are connected to inlets of each central unit. Supply-air ducts typically terminate in supply-air register boxes mounted to the walls, the ceilings, or other surfaces within the interior, whereas return-air ducts typically begin at register boxes mounted to a surface within the interior, such as a wall, ceiling, or floor. There are usually many more register boxes for supplying air than for returning air, with those for returning air typically being substantially larger than those for supplying air.

To increase efficiency, building codes are being revised to require substantially airtight HVAC systems. In the past, a standard technique has been utilized for forming such sheet-metal register boxes. A form is cut from a rectangular, planar metal sheet. The form has cutouts for corners or other features to allow bending of the form into the desired shape. Cutouts define the height of the sides and an overlapping flap is formed by cutting a slot at each cut out. The sides are bent along bend lines to lie in intersecting planes so as to form an open-bottom, rectangular enclosure of a register box, with the vertical edges of the sides abutting the inside surfaces of the sides. The flap is folded around each corner that lies adjacent the outer surface of the side and then fastened to the side with rivets. In order to complete the register box, a circular duct connector or is connected to a circular cutout in the upper surface of the box. Prior art register boxes are also formed with abutting edges to form the enclosure. The abutting or overlapping edges may be fastened by adhering or by other fastening means, such as spot welding.

The method described above produces ducting enclosures that often leak conditioned air through the gaps between the edges at the corners, or, in the case of enclosures formed with multiple pieces, through the seams where the pieces are joined together. The prior-art method includes many labor-intensive steps to form the enclosures, including the cutting of the planar sheet and the fastening of the edges.

In order to achieve the requisite efficiency in compliance with building codes, insulation is used with such register boxes. The formation of the insulation of the register boxes has become somewhat of a problem. Since the boxes are conventionally made of sheet metal, such as galvanized steel or aluminum, the insulation must be applied to either or both the inside and outside of the register box either before or after it is installed. The cutting and fastening of the insulation to the box is tedious and time-consuming. As such, it is thereby rather expensive in terms of the cost of the insulation material and in terms of the amount of time required to properly insulate the register box.

The placement of insulation can be a time-consuming, hazardous, and tedious task. Typically, a large section of fibrous material requires a cutting into various shapes that fit within the interior of the register box. This fibrous material is then affixed to the walls on the inside of the register box by hand. Often, many steps are required so as to properly fit the insulation material within the register box. Furthermore, since fibrous material is being manually handled by workers, there can be exposure to airborne fibers. The cutting and fitting of the insulation material within the register box is extremely tedious and boring to workers.

In the past, various patents have issued relating to register boxes and to the insulating of such register boxes. For example, U.S. Pat. No. 3,985,158, issued on Oct. 12, 1976 to J. V. Felter, describes a box for mounting diffusers wherein the main body of the box is made of expanded plastic or similar material. One or more connection elements are molded within the walls of the box to provide for connection of the box to the building structure and to a duct and also to reinforce the box.

U.S. Pat. No. 4,735,235, issued on Apr. 5, 1988 to Anderson et al., discloses an insulated duct end system. The system includes duct assemblies and transition components for interconnecting the duct assemblies. Each duct assembly includes an insulated duct having a rigid sleeve within at least one end. Each sleeve includes an abutment ring and orifices in the ring for permitting air to flow into the insulated area to balloon the layer and improve its insulative effect.

U.S. Pat. No. 5,095,942, issued on Mar. 17, 1992 to G. C. Murphy, teaches a plastic self-insulating ductwork system. The system includes a distribution box which includes an upper portion having a plurality of walls and a bottom plate. The distribution box is joined to interconnecting duct lines by adapter conduits. The adapter conduits are adapted at one end for connection to an opening in the wall and are adapted at the other end for connection to an adjoining duct line. U.S. Pat. No. 5,219,403, issued on Jun. 15, 1993 the G. C. Murphy, discloses a similar type of self-insulating ductwork system as that of U.S. Pat. No. 5,095,942.

U.S. Pat. No. 5,658,196, issued on Aug. 19, 1997 to T. L. Swaim, provides an air duct diffuser for attachment to a ceiling grid. The diffuser includes a frame which mounts to the ceiling grid and a louver which mounts to the frame for directing diffused air within an associated airspace. A preformed composite housing of insulating material mounts to the frame and has punch-out duct openings of varying sizes.

U.S. Pat. No. 5,749,190, issued on May 12, 1998 to S. R. Williams, shows an HVAC register box having no welded or riveted corners and also a process for making such an HVAC register box. The register box is fabricated from a single sheet of material without cutting. The register box has superior rigidity and resistance to air leakage at the joints or corners.

U.S. Pat. No. 5,957,506, issued on Sep. 28, 1999 to M. D. Stepp, provides a sheet-metal insulated register box. The register box has an adjustable elbow fitting that is coupled directly to an air inlet panel of an air distribution register box by having roll-formed flange portions that are mated in interlocking, overlapping engagement with each other. The air inlet panel includes an outwardly flared coupling flange bordering an air inlet opening. The neck of the sheet-metal elbow includes a folded coupling flange that is dimensioned for interfitting, overlapping engagement with the outwardly-flared elbow coupling flange.

U.S. Patent Publication No. 2008/0014860, published on Jan. 17, 2008 to Heitman et al., discloses a method and apparatus for eliminating register boxes. A collar plate assembly interfaces with metal air ducts and is provided with at least one spring indentation ring to accept two or more locking springs. The locking springs are used to attach the ceiling register to the collar plate assembly. The collar plate assembly uses mounting rails that attach the assembly to either the ceiling or wall supports. A trim ring is inserted in the cutout that attaches between the collar in the ceiling so as to eliminate air leakage and so as to provide an essentially smooth flow of air from the supply duct to the inside of the structure.

U.S. Patent Publication No. 2004/0130154, published on Jul. 8, 2004 to Stepp et al., shows a substantially airtight register box for HVAC systems. The register box has a body formed from at least one planar sheet. The body has an inlet and outlet. At least one of the inlet and the outlet is formed by folding corners of the planar sheet to form planar sides that lie in intersecting planes. The enclosure is then mounted to a surface of an interior area of a structure and is connected to ducts for communicating air between the interior area at a central air-handler unit.

U.S. Patent Publication No. 2008/0045137, published on Feb. 21, 2008 F. Rosal, discloses an insulated plenum box for heating, ventilating and air conditioning duct systems. This plenum box has insulation sprayed onto either the inside or outside of the plenum box in order to match the R-value of the connecting insulated duct.

The present Applicant is the owner of several patents and patent application publications related to such register boxes and the processes for forming such register boxes. For example, U.S. Patent Application No. 2018/0363942, published on Dec. 20, 2018 to the present Applicant, describes an insulated register box and process for forming the insulated register box. This register box has a body with a plurality of side walls arranged in a generally rectangular or square configuration and a plurality of flanges extending inwardly from the plurality of side walls. An expandable polymeric material is affixed to an inner side of each of the plurality of side wall such that the expandable polymeric material has a portion extending across one end of the body inwardly of the plurality of flanges. A sheet is positioned over the portion of the expandable polymeric material at one end of the body such that the sheet is interposed between the plurality of flanges and the portion of the expandable polymeric material. The expandable polymeric material and the sheet are cuttable so as to open to the interior of the register box.

U.S. Pat. No. 10,648,695, issued on May 12, 2020 to the present Applicant, describes a register box with a boot rail adapter that has an insulating material affixed within the register box, a guide rail affixed to a side panel of the register box, and a rail having a section received in a slot of the rail guide. The rail is adapted to be affixed to a supporting surface, such as a joist. The rail guide is slidable relative to the rail. The rail guide is affixed to an exterior surface of the side panel.

U.S. Pat. No. 10,309,682, issued on Jun. 4, 2019 to the present Applicant, teaches a process for insulating a register box in which the register box has a plurality of side panels arranged in a generally rectangular configuration and a duct opening through a wall that extends across the generally rectangular configuration. This process involves flowing an expandable polymeric material toward the plurality of side panels, placing the register box into or onto a support structure, introducing a liner over the flowed expandable polymeric material within the register box, and placing a form onto the liner in the register box so as to shape the expandable polymeric material within the register box. The form and the liner then removed from the register box.

U.S. Patent Application Publication No. 2018/0320921, published on Nov. 8, 2018 to the present Applicant, teaches an insulated register box apparatus with a boot rail adapter which has an insulating material affixed within the register box, a rail affixed to a side panel of the register box, and a rail guide having a slot that receives a section of the rail therein. The rail guide is adapted to be affixed to a supporting surface. The rail is affixed at least one of the side panels of the register box. The rail is slidable relative to the rail guide. The register box has a plurality of side panels and a duct that opens to an interior of the plurality of side panels. The insulating material extends inwardly of the plurality of side panels.

U.S. Patent Application Publication No. 2018/0187919, published on Jul. 5, 2018 to the present Applicant, teaches an insulated register box for HVAC installations that has a body with a plurality of side panels arranged in a generally rectangular or square configuration and a wall extending across the rectangular configuration. A duct opens through the wall so as to communicate with an interior of the body. An expandable foamed polymeric material is affixed to an inner side of the side panels. The wall has a surface extending from the opening of the duct to the side panels. The expandable foamed polymeric material is affixed to the surface of the wall.

U.S. Pat. No. 9,951,969, issued on Apr. 24, 2018 to the present Applicant, describes an insulated register box and a method for forming such an insulated register box. The register box has a body with a plurality of side panels arranged in a generally rectangular or square configuration and a wall extending across the rectangular configuration. A duct opens through the wall so as to communicate with the interior of the body. An expandable foamed polymeric material is affixed to an inner side of the side panels. The wall has a surface extending from the opening of the duct to the side panels. The expandable foamed polymeric material is affixed to the surface of the wall.

A problem facing many business owners and homeowners is that the already-installed register box within their buildings are filled with fibrous insulation. In view of the problems associated with such fibrous insulation, as recited hereinabove, there is a need to be able to retrofit the expandable polymeric foam material into existing installed register boxes. It often becomes quite difficult to introduce such expandable polymeric material into existing register boxes because of the location of such register boxes on the floor, walls and ceiling of homes and other buildings. Under those circumstances where the register box is embedded in sheetrock, it becomes very difficult to remove the register box without destroying the sheetrock. As such, a need has developed so as to be able to apply expandable polymeric foam material into an existing register box in a simple, efficient and effective manner.

It is an object of the present invention to provide a method in which expandable polymeric foam material can be introduced into an existing register box.

It is another object of the present invention provide a method whereby the expandable polymeric foam material can be introduced into a register box that is embedded in sheetrock.

It is still another object of the present invention to provide a method whereby expandable polymeric foam material can effectively cover all of the surfaces on the interior of the register box without flowing into the duct of the register box.

It is still another object of the present invention provide a method for introducing an expandable polymeric foam material into a register box which can be utilized with register boxes located in elevated and difficult-to-reach locations.

It is still another object of the present invention to provide a method for introducing expandable polymeric foam material into an existing register box which is easy to use, relatively inexpensive, and effective.

It is still another object of the present invention provide a method for introducing expandable polymeric foam material into an existing register box that effectively insulates the interior of the register box.

It is a further object of the present invention for provide a method for insulating a register box avoids the use of fibrous material.

These and other objects and advantages of the present invention will become apparent from a reading of the attached specification and appended claims.

BRIEF SUMMARY OF THE INVENTION

The present invention is a method of insulating a register box. The register box has a body and a duct. The method comprises the steps of: (1) accessing the register box such that an interior of the register box can be reached; (2) removing existing insulation from the interior of the body of the register box; (3) injecting an expandable polymeric material into the interior of the body of the register box; and (4) allowing the expandable polymeric material to cure for a period of time.

In the method of the present invention, the opening of the duct is blocked during the step of curing. Specifically, in the preferred embodiment of the present invention, a cylindrical or rectilinear member is inserted into the interior of the body of the register box so as to bear against the opening of the duct. A sheet of polymeric film is placed over the exterior of the cylindrical or rectilinear member so as to be interposed between an end of the cylindrical or rectilinear member and the opening of the duct and also to be interposed between the expandable polymeric material and the side of the cylindrical or rectilinear member. The sheet of polymeric film serves to allow for simple and easy removal of the cylindrical or rectilinear member from the interior of the body of the register box.

In one embodiment of the present invention, the register box is e affixed to sheetrock. The body of the register box has an opening extending through a thickness of the sheetrock. The step of injecting further includes inserting a foam gun into the opening of the body of the register box and directing the expandable polymeric material from the foam gun toward a wall of the body of the register box. In particular, the foam gun is rotated so as to direct the expandable polymeric material from the foam gun toward all side walls of the body of the register box. A nozzle can be applied to the foam gun. In particular, the nozzle is affixed to an outlet of the foam gun. This nozzle can be a replaceable straw. The replaceable straw is removed from the outlet of the foam gun following the step of injecting. As such, separate straws are utilized for the introduction of expandable polymeric material into separate register boxes.

A panel is positioned over the opening of the body of the register box. This panel has a port extending therethrough. A portion of the foam gun extends through this port of the panel so as to enter the interior of the body of the register box. This panel is removably affixed to the sheetrock.

In an alternative embodiment, the register box is affixed to a floor. The body of the register box has an opening extending through a thickness of the floor. The step of injecting includes inserting a foam gun into the opening of the body of the register box and directing the expandable polymeric material from the foam gun toward a wall of the body of the register box. A panel can be positioned over the opening of the body of the register box. This panel has a port extending therethrough. A portion of the foam gun extends through the port of the panel so as to enter the interior of the body of the register box. The panel is removably affixed to the floor.

In the present invention, the step of removing existing insulation comprises pulling the existing insulation from the interior of the register box by hand through the opening of the body of the register box.

In an embodiment of the present invention, the panel can have an elastomeric gasket positioned on a surface thereof. The panel can be of a sheet metal material. The step of positioning the panel includes placing the panel such that the elastomeric gasket bears against edges around the opening of the body of the register box. The port extends through the elastomeric gasket.

In the present invention, the panel is removed following the step of injecting the expandable polymeric material and prior to the step of blocking the opening of the duct. The panel is removed so as to expose the opening of the body of the register box. The cylindrical or rectilinear member is inserted into the opening after the panel is removed.

This foregoing Section is intended to describe, with particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
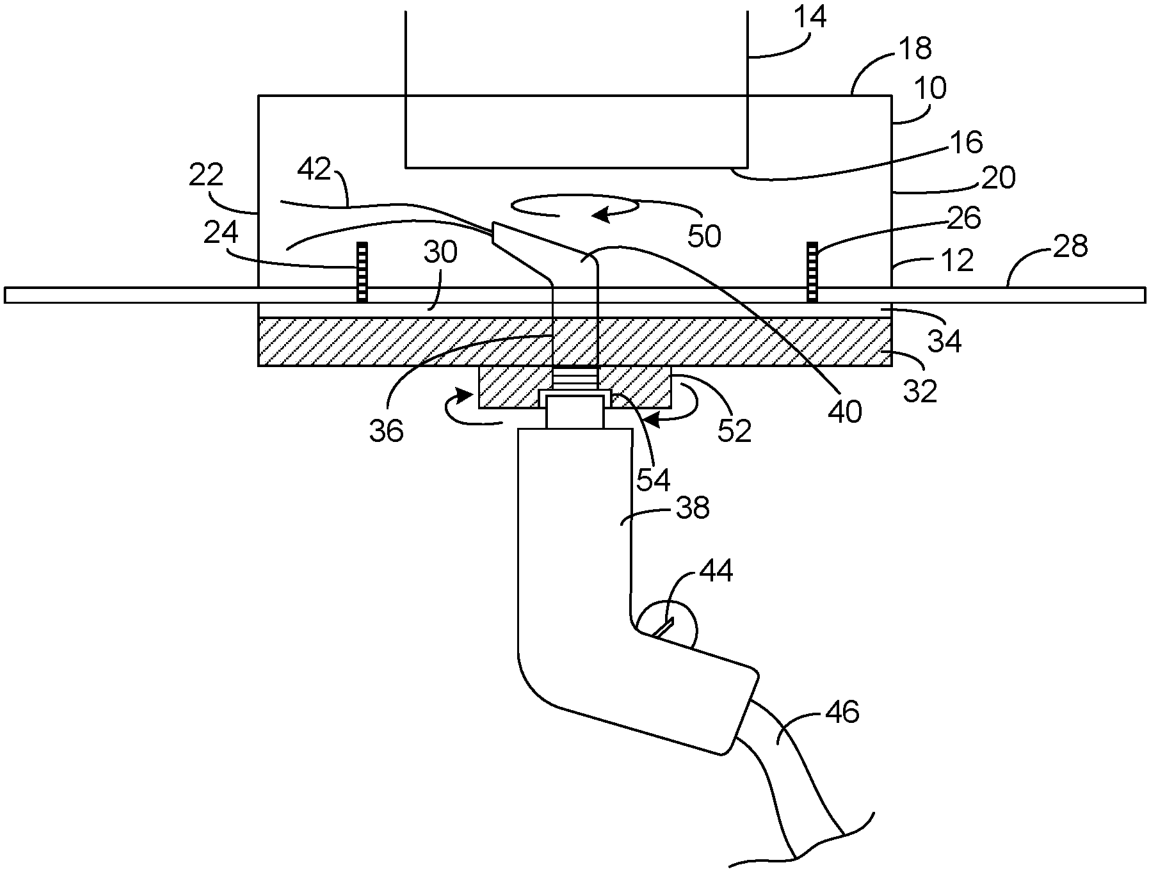
FIG. 1 is a side cross-sectional view showing the injection of expandable polymeric material into the interior of an existing register box.

Referring to FIG. 1, there is shown a step in the process of retrofitting an existing register box with an expandable polymeric foam material. In particular, the existing register box has a body 12 and a duct 14. The duct 14 has an opening 16 that opens to the interior 18 of the body 12. The body 12 is of a generally of a rectangular configuration can include side walls 20 and 22. The side wall 22 extends so as to have flange 24 extending upwardly into the interior 18 of the body 12. Side 20 includes flange 26 extending upwardly into the interior of the body 12. The register box 10 is installed into sheetrock 28 in a rather permanent manner.

In the present invention, the register box 10 is an existing register box which is filled with a fibrous insulation. In view of the problems associated with fibrous insulation, along with the deterioration of such fibrous insulation over time, it is important to be able to replace such fibrous insulation with an expandable polymeric material so as to achieve the advantages of such expandable polymeric material recited hereinabove. As such, the opening 30 to the body 12 of register box 10 is accessed. Typically this access can be achieved by removing the grate or screen extending over the opening 30. The interior 18 of the register box 10 will then be accessible by hand. The fibrous insulation can be removed from the interior 18 of the register box 10 by hand by pulling such fibrous material through the opening 30 and disposing of the fibrous material. As such, a register box 10 void of insulation is created. The next step in the method of the present invention is to introduce the expandable polymeric material into the interior 18 of the register box 10. As can be seen in FIG. 1, a panel 32 is placed over the opening 30 of the body 12 of register box 10. Panel 32 can be of a sheet metal material, or of other rigid construction. An elastomeric or rubber gasket 34 is positioned over a face of the panel 32 so as to be interposed between the panel 32 and the edges of the opening 30. As such, a generally liquid-tight configuration is achieved by virtue of this gasket 34 in combination with the panel 32. A port 36 extends through the panel 32 and through the gasket 34. Port 36 will allow access to the interior 18 of the register box 10.

FIG. 1 shows that there is a foam gun 38 having a nozzle 40. The nozzle 40 has a generally angular configuration. Nozzle 40 serves to direct a stream of polymeric foam material 42 toward one of the side walls 20 and 22 of the body 12 of register box 10. Nozzle 40 is connected to an outlet of the foam gun 38. Foam gun 38 includes a trigger 44 that allows an operator to draw the expandable polymeric foam material through conduit 46 attached to a supply of such polymeric foam material. The polymeric foam material is released from the nozzle 40. It is generally important that the polymeric foam material be directed so as to reside between the flange 24 and the side wall 22 (or between the side wall 20 and the flange 26). The foam gun 38 is rotatable (as shown by arrow 50) so that the expandable polymeric material 42 is directed to all of the side walls of the body 12 of the register box 10.

In the present invention, the nozzle 40 is in the nature of a replaceable straw. It is important to note that every time the foam gun 38 is used and expandable polymeric material 42 is introduced into the register box 10, a certain amount of the expandable polymeric material would cling to the inner walls of the replaceable straw. Over time, this can impede the ability to effectively deliver the expandable polymeric material. As such, the nozzle 40 should be replaced after a certain period of time or between applications of the expandable polymeric material.

It can be seen that the register box 10 is placed in sheetrock 28. Sheetrock 28 acts as the ceiling of a building or home. In other embodiments, the sheetrock 24 can be in the nature of side walls of the building or home. Still, in other applications, the sheetrock can be a floor of a building. In those circumstances where the sheetrock 28 is not actual sheetrock, but a floor of a building, the configuration of FIG. 1 is reversed such that the register box 10 is on the bottom and the foam gun 38 is on top.

In the embodiment shown in FIG. 1, it is actually the foam gun 38 that is rotated by a user. The user can be standing on a ladder and simply rotate the foam gun so as to introduce the expandable polymeric material into the interior 18 of the register box 10. In other circumstances, mechanical means can be utilized in conjunction with the foam gun 38 such that the nozzle 40 is rotated so as to evenly introduce the expandable polymeric material 42 throughout the interior of the register box 10. Such rotation can occur upon the pulling of the trigger 44. FIG. 1 further shows that there is a support 52 affixed to a side of the panel 32 opposite the elastomeric gasket 34. Support 52 includes an opening 54 for further support of the foam gun 38 and the nozzle 40.

Figure 2:
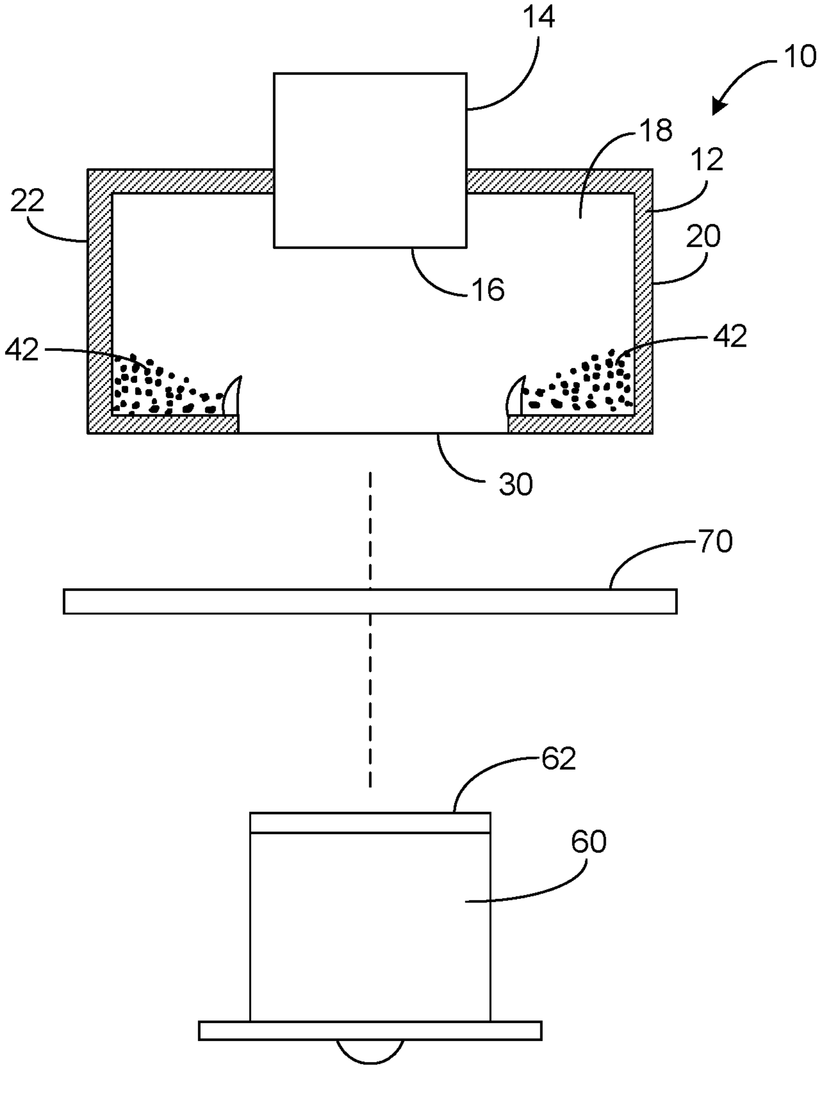
FIG. 2 shows the placement of a blocking member into the interior of the existing register box after the step of injecting.

FIG. 2 shows the configuration of the register box 10 of the present invention after the expandable polymeric material 42 has been introduced. In FIG. 2 it can be seen that the expandable polymeric material 42 resides against the side walls 20 and 22 of the body 12 of register box 10. The duct 14 has its opening 16 positioned away from the opening 30 of the body 12. In this configuration, the expandable polymeric material 42 will not enter the interior of the duct 14. If any expandable polymeric material would enter the interior of the duct 14 through the opening 16, it could block the flow of air passing through the duct 14. As such, as the expandable polymeric material 42 cures, it is important to avoid the expansion of such expandable polymeric material into the opening 16 and into the interior of the duct 14. It is also important to form a cavity within the body 12 so that the expandable polymeric material is configured into a desired shape for air flow.

In particular, FIG. 2 shows that there is a cylindrical or rectilinear member 60 that is adapted for installation through the opening 30 of the body 12 of register box 10 and against the opening 16 of the duct 14. The cylindrical or rectilinear member 60 has an end 62 having a diameter or width greater than the diameter of the opening 16 of duct 14. As such, when the member 60 is introduced into the opening 30 and bears against the opening 16 of the duct 14, it will block the flow of the expandable polymeric material into the opening 16 of duct 14. The sides of the member 60 will also create the void within the interior 18 of register box 10 that allows air to flow therethrough.

At this stage, the foam gun 38 and nozzle 40 have been removed from the interior 18 of the body 12. Additionally, the panel 32 and elastomeric gasket 34 have been removed. As such, the opening 30 of the register box 10 is exposed. At this stage, the expandable polymeric material 42 will cure so as to expand and solidify. This covers all the exposed edges, joints and surfaces of the register box 10.

In order to create the void within the interior of the register box 10, a sheet of polymeric film 70 is provided. The sheet a polymeric film 70 will be placed so as to extend over the end 62 and sides of the cylindrical or rectilinear member 60. As such, when the member 60 is inserted into the opening 30 so as to bear against the opening 16 of duct 14, the sheet a polymeric film 70 will be interposed between the end 62 and the edges of the opening 16. Similarly, the sheet a polymeric film 70 will reside over the sides of member 60 so as to be interposed between the expandable polymeric material and the member 60. Upon curing, the member 60 can be easily removed because of this sheet of polymeric film.

Figure 3:
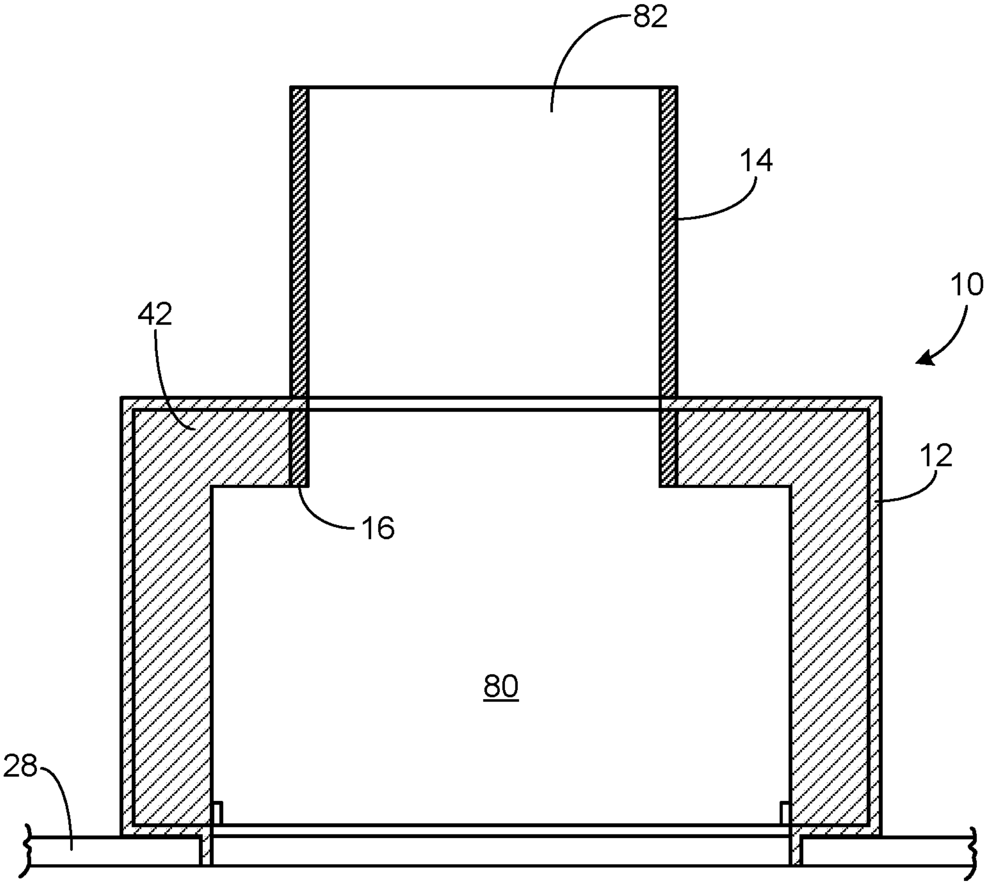
FIG. 3 is across-sectional view showing the completed installation of the expandable polymeric foam material into the existing register box.

FIG. 3 shows the configuration of the present invention after the expandable polymeric material 42 has cured. As can be seen, there is a void 80 created in the interior of the body 12 of register box 10. None of the expandable polymeric material 42 has entered the interior 82 of duct 14. Because of the use of the member 60 and the sheet of polymeric film 70, the opening 16 of duct 14 is free of the expandable polymeric material. As such, air flow through the interior 82 of the duct 14 is unimpeded.

FIG. 3 shows that the register box 10 continues to be embedded in the sheetrock 28. As such, the present invention provides a technique whereby the expandable polymeric foam material 42 can be retrofitted into an existing register box without removing the register box 10 from the sheetrock 28 or causing the damage or destruction of the sheetrock 28. This installation can be carried out in a simple and effective manner. As such, the present invention provides the benefits of the expandable polymeric material without the need for the replacement of the entire register box.

The foregoing disclosure and description of the invention is illustrative and explanatory thereof. Various changes in the details of the illustrated construction can be made is the scope of the present invention without departing from the true spirit of the invention.

I claim:

1. A method of insulating a register box, the register box having a body and a duct which opens to an interior of the body, the method comprising:
- accessing the register box such that the interior of the register box can be reached;
- removing existing insulation from the interior of the body of the register box;
- injecting an expandable polymeric material into the interior of the body of the register box; and
- allowing the expandable polymeric material to cure for a period of time within the interior of the body of the register box;
- blocking an opening of the duct during the step of curing; and
- inserting a cylindrical or rectilinear member into the interior of the body of the register box so as to bear against the opening of the duct.

2. The method of claim 1, the step of blocking further comprising:
- placing a sheet of a polymeric film over a portion of an exterior of the cylindrical or rectilinear member during the step of inserting the cylindrical or rectilinear member such that the sheet of polymeric film is interposed between the opening of the duct and an end of the cylindrical or rectilinear member, the sheet of polymeric film being interposed between the cylindrical or rectilinear member and the expandable polymeric material in the body of the register box.

3. The method of claim 1, the register box being affixed to sheetrock, the body of the register box having an opening extending through a thickness of the sheetrock, the step of injecting comprising:
- inserting a foam gun into the opening of the body of the register box; and
- directing the expandable polymeric material from the foam gun toward a wall of the body of the register box.

4. The method of claim 3, further comprising:
- rotating the foam gun so as to direct the expandable polymeric material from the foam gun toward all side walls of the body of the register box.

5. The method of claim 3, further comprising:
- applying a nozzle to the foam gun, the nozzle being affixed to an outlet of the foam gun.

6. The method of claim 5, the nozzle being a replaceable straw.

7. The method of claim 3, the step of removing existing insulation comprising:
- pulling the existing insulation from the interior of the register box by hand through the opening of the body of the register box.

8. The method of claim 3, the foam gun having a nozzle formed from a replaceable straw, the method further comprising:
- removing the nozzle from the foam gun following the step of injecting the expandable polymeric material.

9. The method of claim 1, the expandable polymeric material being polyurethane.

10. A method of insulating a register box, the register body having a body and a duct which opens to an interior of the body, the register box being attached to a sheetrock, the body of the register box having an opening extending through a thickness of the sheetrock, the method comprising:
- accessing the register box such that the interior of the register box can be reached;
- removing existing insulation from the interior of the body of the register box;

injecting an expandable polymeric material into the interior of the body of the register box of the register box, the step of injecting comprising:

positioning a panel over the opening of the body of the register box, the panel having a port therethrough;

extending a portion of a foam gun through the port of the panel so as to enter the interior of the body of the register box; and directing the expandable polymeric material from the foam gun toward a wall of the body of the register box; and allowing the expandable polymeric material to cure for a period of time within the interior of the body of the register box.

11. The method of claim 10, further comprising:

removably affixing the panel to the sheetrock.

12. The method of claim 10, the panel having an elastomeric gasket positioned on a surface thereof, the step of positioning the panel comprising:

placing the panel such that the elastomeric gasket bears against edges around the opening of the body of the register box.

13. The method of claim 12, the port extending through the elastomeric gasket.

14. The method of claim 10, further comprising:

removing the panel following the step of injecting the expandable polymeric material.

15. A method of insulating a register box, the register body having a body and a duct which opens to an interior of the body, the register box being affixed to a floor, the body of the register box having an opening extending through a thickness of the floor, the method comprising:

accessing the register box such that the interior of the register box can be reached;

removing existing insulation from the interior of the body of the register box;

injecting an expandable polymeric material into the interior of the body of the register box of the register box, the step of injecting comprising:

positioning a panel over the opening of the body of the register box, the panel having a port therethrough;

inserting a foam gun into the opening of the body of the register box; and directing the expandable polymeric material from the foam gun toward a wall of the body of the register box; and allowing the expandable polymeric material to cure for a period of time within the interior of the body of the register box.

16. The method of claim 15, further comprising:

removably affixing the panel to the floor.

* * * * *